(12) United States Patent
Kallergi

(10) Patent No.: US 7,430,308 B1
(45) Date of Patent: Sep. 30, 2008

(54) COMPUTER AIDED DIAGNOSIS OF MAMMOGRAPHIC MICROCALCIFICATION CLUSTERS

(75) Inventor: Maria Kallergi, Tampa, FL (US)

(73) Assignee: University of South Florida, Tampa, FL (US)

( * ) Notice: Subject to any disclaimer, the term of this patent is extended or adjusted under 35 U.S.C. 154(b) by 729 days.

(21) Appl. No.: 10/723,540

(22) Filed: Nov. 26, 2003

Related U.S. Application Data

(60) Provisional application No. 60/319,735, filed on Nov. 26, 2002.

(51) Int. Cl.
*G06K 9/00* (2006.01)
(52) U.S. Cl. ...................................................... 382/128
(58) Field of Classification Search .................. 382/128
See application file for complete search history.

(56) References Cited

U.S. PATENT DOCUMENTS

| | | | | |
|---|---|---|---|---|
| 5,586,160 | A * | 12/1996 | Mascio | 378/37 |
| 5,854,851 | A * | 12/1998 | Bamberger et al. | 382/132 |
| 6,056,690 | A * | 5/2000 | Roberts | 600/300 |
| 7,263,214 | B2 * | 8/2007 | Uppaluri et al. | 382/128 |

OTHER PUBLICATIONS

Kallergi, Maria. Computer-aided Diagnosis of Mammographic Microcalcification Clusters. Med. Phys. 31 (2), Feb. 2004. pp. 314-318.

\* cited by examiner

*Primary Examiner*—Bhavesh M Mehta
*Assistant Examiner*—Jonathan Schaffer
(74) *Attorney, Agent, or Firm*—Anton J. Hopen; Smith & Hopen, P.A.

(57) ABSTRACT

Computer aided diagnosis techniques in medical imaging are developed for the automated differentiation between benign and malignant lesions and go beyond computer aided detection by providing cancer likelihood for a detected lesion given image and/or patient characteristics. A computer aided detection and diagnosis algorithm for mammographic calcification clusters is developed and evaluated. The emphasis is on the diagnostic component although the algorithm includes automated detection, segmentation, and classification steps based on wavelet filters and artificial neural networks. Classification features are selected primarily from descriptors of the morphology of the individual calcifications and the distribution of the cluster as well as patient's demographics as input to the network. Te selected features are robust morphological and distributional descriptors, relatively insensitive to segmentation and detection errors such as false positive signals and variations among imaging sources or imaging equipment.

8 Claims, 19 Drawing Sheets

Fig. 2

$$C = \frac{P^2}{A} \quad or \quad C = \frac{P^2}{4\pi A} \quad or \quad C = 1 - \frac{4\pi A}{P^2} \quad or \quad C = \frac{A_1}{A}$$

Fig. 3

$$P = N_e + \sqrt{2} \, N_o$$

Fig. 4

$$FF = \frac{\left[ \sum_{n=-N/2+1}^{N/2} \|NFD(n)\|/|n| \right]}{\left[ \sum_{n=-N/2+1}^{N/2} \|NFD(n)\| \right]}$$

Fig. 5

$$NFD(n) = \begin{cases} 0; & n = 0 \\ S(n)/S(1); & n = 1, 2, \ldots, N/2 \\ S(n+N)/S(1); & n = -1, -2, \ldots, -N/2+1 \end{cases}$$

Fig. 6

$$S(n) = \frac{1}{N}\sum_{k=0}^{N-1} s(k)\exp[-j2\pi nk/N], n=0,1,2,\ldots,N\text{-}1,$$

Fig. 7

$$m_p = \frac{1}{N}\sum_{i=1}^{N}[z(i)]^p$$

Fig. 8

$$\mu_p = \frac{1}{N}\sum_{i=1}^{N}[z(i)-m_1]^p$$

Fig. 9

$$M = \frac{(\mu_4)^{1/4}}{m_1} - \frac{(\mu_2)^{1/4}}{m_1}$$

Fig. 10

$$\varepsilon = \frac{(m_{2,0}-m_{0,2})^2 + 4m_{1,1}^2}{(m_{2,0}+m_{0,2})^2}$$

Fig. 11

$$m_{pq} = \sum_x \sum_y x^p y^q f(x,y)$$

$$\mu_{pq} = \sum_x \sum_y (x-\bar{x})^p (y-\bar{y})^q f(x,y)$$

COMPUTER AIDED DIAGNOSIS OF MAMMOGRAPHIC MICROCALCIFICATION CLUSTERS

CROSS-REFERENCE TO RELATED DISCLOSURES

This application claims priority of a provisional application entitled "Computer Aided Diagnosis Methodology for Mammographic Calcifications," filed Nov. 26, 2002 by the present inventors and bearing application number 60/319,735.

STATEMENT OF GOVERNMENT INTEREST

The work that led to this invention has been supported in part by a grant from the National Institute of Health, NCI Grant Number R29CA71479. Thus, the United States Government may have certain rights to this invention.

FIELD OF INVENTION

This invention relates to computer software helping in a differentiation task, hence increasing the accuracy of a human (radiologist) reader. More specifically, this invention addresses the problem of the low positive predictive value in mammography.

BACKGROUND OF THE INVENTION

Human readers have been investigating and analyzing mammographic abnormalities for the past 30 years. Microcalcifications are the most important symptom in the identification of carcinomas on mammograms. Readers have attempted to characterize calcifications for the past 30 years in an effort to differentiate visually benign from malignant genesis. The literature provides examples of a large variety of descriptors of morphology and distribution of breast calcifications. Several of these descriptors have been linked to likelihood of malignancy and can be used as indicators of suspiciousness. A summary of the descriptors reported to-date is presented in the following Tables 1 and 2. Table 1 lists the forms, including shape, morphology and distribution of the individual microcalcifications listed in the clinical literature that suggest benign or malignant disease. Table 2 lists the intensity and group descriptors of calcifications listed in the clinical literature.

TABLE 1

| Form Descriptor | Probable Genesis Type<br>B: Probably Benign<br>M: Suggestive of Malignancy<br>U: Uncertain |
|---|---|
| Linear | M |
| Branching or V, W, X, Y, Z shapes | M |
| Small numerous irregular | U |
| Punctiform in a monomorphic group | B |
| Punctiform in a monomorphic group or of varying size | M |
| Angular | U |
| Smooth dense | B |
| Hollow or ring or radiolucent or eggshell | B |
| Annular | B |
| Fine with major variations or very fine, hardly visible | M or U |
| Worm-like | M |
| Bean form | M |
| Undulating line of various lengths | M |
| Amorphous | U |
| Roundish or faceted | B |
| Tea cup-like | B |
| Clumpy with rounded edges | B |
| Ovoid | B |

TABLE 2

| Intensity and Group descriptors | Probable Genesis Type<br>B: Probably Benign<br>M: Suggestive of Malignancy<br>U: Uncertain |
|---|---|
| Blurred contours | B |
| Pale | B |
| Polymorphic group | M |
| Monomorphic group | B |
| Small, clustered | M |
| Linear tubular in parallel tracks (vascular) | B |

A visual system of differential diagnosis based on the morphological properties of single and grouped calcifications has shown to lead to 97.6% sensitivity (correct identification of cancers) and 73.3% specificity (correct identification of benign cases). From this visual system to the establishment of the Breast Imaging Reporting and Data System (BIRADS) lexicon of the American College of Radiology (ACR) in 1993, it is apparent that morphology is one of the most important clinical factors/aids in making the diagnosis of calcifications.

The development of the BIRADS categories for calcifications was based on several of the characteristics listed in Tables 1 and 2. Several formulations were modified and new terms were assigned to better and more generally describe the calcification forms and distributions. The recommended descriptors of the morphology and distribution of the calcifications in the Lexicon are listed in Table 3 for easy reference and comparison. The number of calcifications present is not by itself a clear indicator of benign or malignant disease but combined with other characteristics may increase or decrease suspiciousness.

TABLE 3

BIRADS descriptors for calcifications with associated genesis type
(B: probably benign; M: suggestive of malignancy; U: Uncertain)

| | | |
|---|---|---|
| Morphology or character | Skin (lucent centered) | B |
| | Vascular (linear tubular with parallel tracks) | B |
| | Coarse or popcorn like | B |
| | Large rod-like | B |
| | Round (larger than 0.5 mm) | B |
| | Eggshell or rim (thin walled lucent centered, cystic) | B |
| | Milk of calcium (varying appearance in projections) | B |
| | Dystrophic (irregular in shape, over 0.5 mm, lucent centered) | B |
| | Punctate (round smaller than 0.5 mm) | B |
| | Suture (linear or tubular with knots) | B |
| | Spherical or lucent center (smooth and round or oval) | B |
| | Amorphous or indistinct | U |

TABLE 3-continued

BIRADS descriptors for calcifications with associated genesis type
(B: probably benign; M: suggestive of malignancy; U: Uncertain)

| | | |
|---|---|---|
| | Pleomorphic or heterogeneous granular | M |
| | Fine linear | M |
| | Fine linear branching | M |
| Distribution | Clustered | U |
| | Segmental | U/MU |
| | Regional | U |
| | Diffuse/Scattered | B |
| | Linear | M |
| Number | 1-5 | U |
| | 5-10 | U |
| | >10 | U |

A radiologist makes the final diagnosis of the detected calcifications based on the BIRADS characteristics, demographic information, and associated mammographic findings. However, inter- and inner-observer variability in the assignment of categories or morphological features to the identified calcifications and ambiguity in the interpretation degrades significantly diagnostic performance. Hence, successful differentiation is limited among radiologists and can be as low as 20%. Computer algorithms can assist the radiologist in the diagnostic task with methods that translate and automate the clinical experience.

SUMMARY OF INVENTION

An algorithm is developed and evaluated for the automated diagnosis of calcification clusters in mammograms. This computer algorithm combines automated detection, segmentation, and classification steps for an integrated approach to diagnosis and the differentiation between benign and malignant calcification clusters. The method is based primarily on morphological features following on the footsteps of a clinical, visual analysis system successfully established previously for the same purpose. The algorithm achieves better performance in laboratory tests than the visual system with the possible additional advantage of significantly reduced inter- and intra-observer variability. The one non-image feature used in the classification process is patient age and it proves to be a powerful discriminating factor that when combined with features from the morphology and distribution of the calcifications leads to high and robust classification performances.

The method of differentiating benign from malignant calcifications comprises the steps of first, implementing an automatic detection and segmentation of breast calcifications from mammographic images of a patient; analyzing the shape and distribution of the calcifications and estimation of preselected parameters using image and non-image data from the patient's file; and then, differentiating between benign and malignant calcification clusters and assignment of likelihood of malignancy using a classifier.

Classification performance in the present application is evaluated under various imaging conditions and parameters. Results for different databases shows that almost 100% sensitivity (accurate recognition of cancer-associated calcification clusters) could be achieved with this technique at a specificity of about 85% (accurate recognition of benign clusters) depending on the source of the images and digitization parameters. The robust performance across film digitizers and images sources is achieved through the use of a simple standardization process applied to the images prior to processing. As long as pixel size and depth are within acceptable ranges for CADiagnosis applications in mammography, a standardization algorithm can easily convert the characteristics of any set of data to those for which the CADiagnosis system is initially trained and optimized keeping performance consistent.

Segmentation evaluation is one of the most challenging issues in medical image processing and the use of this classifier's output as a performance measure may offer an advantage over more traditional techniques that use absolute measures of shape and size and require exact ground truth information.

Finally, the developed methodology is amenable to a variety of applications beyond screening and early diagnosis. The input feature set and classification output are currently modified to address problems associated with the diagnostic patient and specific breast disease types involving calcifications, e.g., ductal carcinoma in-situ, for the development of computer tools that go beyond detection and diagnosis into the domains of prognosis, patient management, and follow-up.

BRIEF DESCRIPTION OF THE DRAWINGS

For a fuller understanding of the nature and objects of the invention, reference should be made to the following detailed description, taken in connection with the accompanying drawings, in which:

FIG. 2 defines compactness.

FIG. 3 defines boundary perimeter.

FIG. 4 defines fourier descriptors.

FIG. 5 defines Normalized Fourier Descriptors.

FIG. 6 defines S(n) of the Normalized Fourier Descriptors.

FIG. 7 defines the $p^{th}$ Moment.

FIG. 8 defines the $p^{th}$ central moment.

FIG. 9 defines the measure.

FIG. 10 defines the eccentricity.

FIG. 11 defines for an image f(x,y), the moment of order p+q.

FIG. 12 defines spread.

FIG. 13 defines $\mu_{pq}$ of the spread measure.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of invention.

A method of differentiating benign from malignant calcifications is disclosed, comprising the steps of: implementing an automatic detection and segmentation system with a pattern recognition process of breast calcifications from mammographic images of a patient; analyzing the shape and distribution of the calcifications and estimation of preselected parameters using image and non-image data from the patient's file; inputting the patient's age as a demographic feature that links images to patients; and differentiating between benign and malignant calcification clusters and assignment of likelihood of malignancy using a classifier, wherein the automated method yields an detection and likelihood of malignancy.

Figure 1:
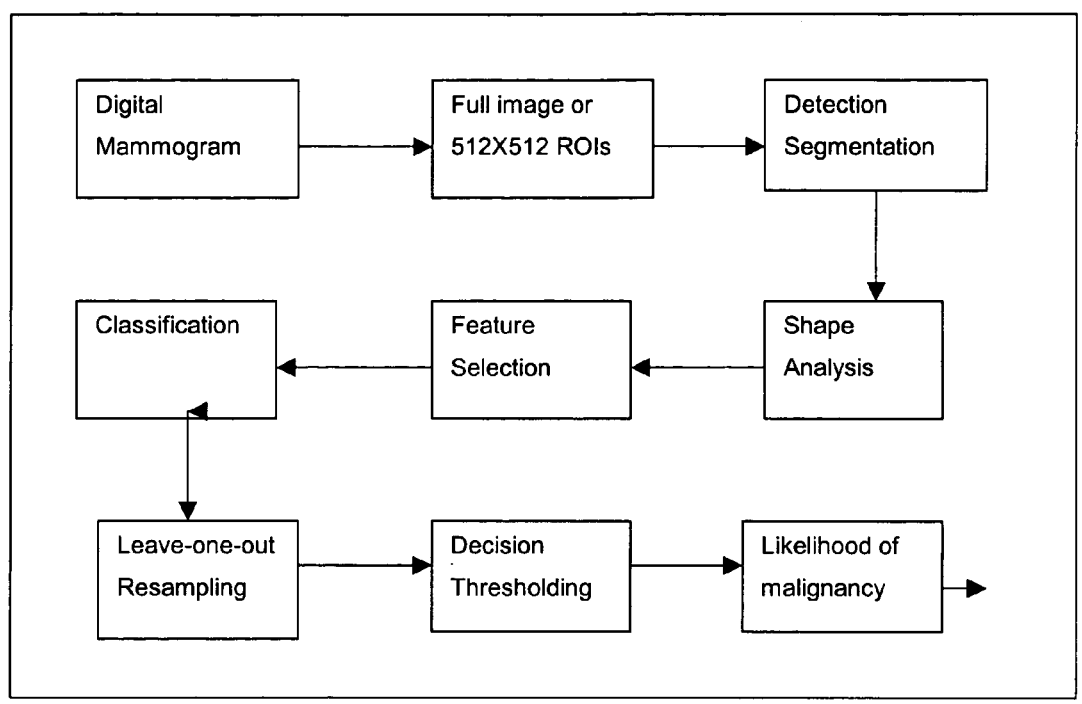
FIG. 1 is a flowchart of the CADiagnosis algorithm for the differentiation of benign from malignant microcalcification clusters.

FIG. 1 presents a flowchart of the various stages of the developed algorithm. The algorithm can be applied to either full mammographic images or regions of interest (ROIs) selected by the radiologist. In the foregoing, the ROI application, implementation, and testing is discussed in detail.

The detection/segmentation method used in this application is based on symmlet wavelets with 12 coefficients. Based on pilot studies, an image resolution of 60 µm and 16 bits per pixel is selected for the main implementation of this technique.

Figure 14:
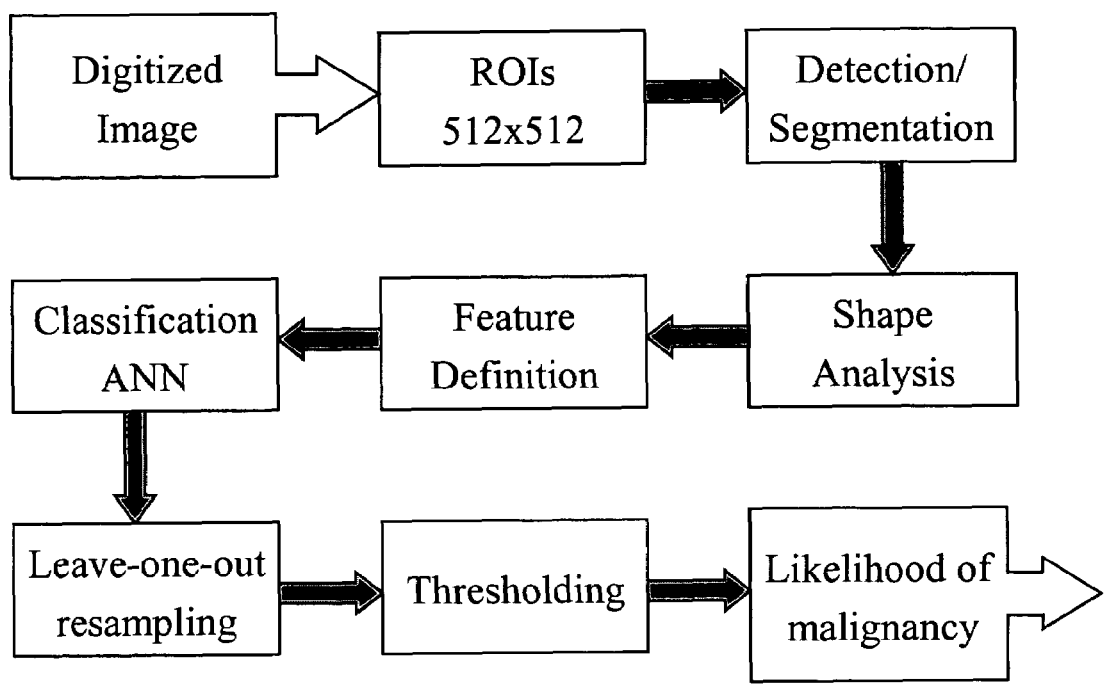
FIG. 14 is a flowchart of the CADiagnosis algorithm developed for the differentiation of benign from malignant microcalcification clusters.

Segmentation of the calcifications is done by a simple thresholding approach based on the histogram of the images and empirically set parameters. A criterion is set on the minimum size of the segmented objects based on the false positive (FP) signal experiment described below. The criterion is set in order to reduce the number of FP signals entering the shape analysis and classification stages and increase classification performance. Specifically, spots smaller than 4 pixels (0.0144 $mm^2$) in area, any configuration, were eliminated from the final segmentation step based on empirical observations and visibility limits reported for calcifications in mammography. Note that our effort did not focus on a detailed optimization of the detection/segmentation methodologies. The goal is to have a detection/segmentation step that preserves the morphology and distribution of the true calcifications in a cluster as much as possible and have a relatively consistent performance. FIGS. 14($a$)-($c$) show a representative ROI with calcifications and the outputs of the filtering and detection/segmentation stages of our methodology.

An assessment of the accuracy of the detection/segmentation of this method may be done by comparing the computer output to the manual outlines generated by an expert mammographer of all major individual calcifications in each of our tested cases. Manual outlines are done with a custom made interface based on IDL (Research Systems Inc., Boulder, Colo.) on a 1024×10≧pixel Sun monitor using the same images and resolution.

The starting point is the implementation of the four shape features for individual calcifications and their modification to apply to calcification clusters. Overall, fourteen features are selected for this application. Two major morphological feature groups can be distinguished in the selected set: one that represents the morphology (shape and margins) of the individual calcifications within a group, and one that represents the morphology of the group as a whole (distribution). Twelve of the morphological features are identified and evaluated on simulated data. To improve performance, the original set is expanded to include two new features representing cluster distribution and patient demographics.

In the final set, shape factors are tested in digital mammography and they show to be robust features in the classification of clusters by either the human observer or the computer. Shape descriptors can be grouped into two large categories: (a) Regional descriptors, which describe the object as a region and include size measurements, and (b) boundary descriptors, which describe the shape of the contour of the object. The area and the compactness are used as regional descriptors whereas the Fourier coefficients of the boundary pixels and three moment-based features are used as boundary descriptors. These six features constituted the first group that represented the shape and margin of the individual calcifications. With the exception of the area, all other selected shape descriptors are scale invariant, which is an important property.

The mean and standard deviation (SD) of each of the six shape features are estimated for each cluster. The six SDs combined with the number of calcifications per cluster constitute the second group of features that represent the cluster and its distribution. Finally, the patient's age is used as the demographic feature that links images to patients. Age proves to be a powerful discriminant of disease.

The most trivial shape parameter is the area A of an object, which is defined as the number of pixels contained within (and including) the boundary of an extracted (segmented) object. The area can also be expressed in $µm^2$ given the pixel size or the image resolution. Although trivial, area offers a good description of the size of an object and provides a good measure of the losses or gains in pixels as a function of image resolution and segmentation.

Compactness (C) is a shape parameter that does not depend on the size of the object on the image plane. Compactness is one of the most common features used in pattern recognition and classification methodologies, independent of application. It is a dimensionless quantity that provides a simple measure of contour complexity versus area enclosed and is independent of translation, rotation and scale. Furthermore, it does not depend on the size of the object on the image plane. Compactness has been defined in a variety of ways, one is shown in FIG. 2, where commonly used definitions are: P is the perimeter of the object, A is the area of the object, $A_1$ is the intersection of A and a circle (or rectangle) that is concentric to A and has area equal to A. The perimeter of the objects P was determined by going through the center points of the boundary pixels using the chain code described in more detail below.

According to the first definition of compactness, C has a minimum value of approximately $4\pi$ (about 12.57) and increases for elongated shapes or shapes with rough contours. According to the second definition, a circle is theoretically the most compact object with the smallest C of 1; elongated objects will then have a C of >1. The third definition is a normalized expression of compactness where the C of a circle is 0 and that of elongated objects is 0<C<1; it tends to 1 for complex shapes. The first three expressions have some limitations when applied to digital images and to objects, the margins of which are made of square or rectangular pixels. In these cases, the first and second definition yield values less than the minimum value and the third definition yields negative values impeding the physical interpretation of the results. The fourth definition, which yields the similarity of an object to a circle or a rectangle (often referred to as circularity or rectangularity) yet gives little information on the irregularity, an important feature for mammographic calcifications.

In the present application, all four definitions of Compactness in the pilot studies and the results of classification, keeping all other features the same have been compared. The smallest classification error is obtained with the second definition and it is adopted as part of the present feature set. However, theoretical limits and expectations do not hold in this application and one should not interpret compactness values as similarity or dissimilarity to a circle. Values should be used as a relative measure of the shape of the calcifications, i.e., the larger the compactness value, the more irregular and elongated the object, the smaller the value the more symmetric the object is.

The perimeter P is the circumferential distance around the boundary and can be obtained in a variety of ways. The boundary chain code method is used in the present implementation. Chain codes are used to represent a boundary by a connected sequence of straight line segments of specified length and direction. Since the chain code is a complete representation of an object's boundary or curve, it can be used to calculate features such as perimeter, length and width of an object. In the case of an 8-connected chain code, the even-numbered segments have length 1 whereas the odd-numbered segments have length sqrt(2). Thus, the boundary perimeter P is given by FIG. 3, where $N_e$ is the number of even and $N_o$ is the number of odd steps in the boundary chain code.

Other regional descriptors include topological descriptors used to describe regions with holes or connected components, and texture descriptors used to provide measures of smoothness, coarseness and regularity. The former descriptors in this application were not implemented because the calcifications of interest are mostly closed and compact objects. Also, texture descriptors are not selected because it would deviate from the initial goal to focus only on morphology and distribution.

Finally, the number of calcifications n in a cluster is added to the set as a group feature representing cluster size and this may be considered as a regional descriptor. Note that a cluster was defined as a group of 3 or more calcifications within a 1 $cm^2$ area. Five ranges were distinguished: $3 \leq n \leq 5$, $5 \leq n \leq 10$, $10 \leq n \leq 15$, $15 \leq n \leq 20$, and $\geq 20$ calcifications per cluster. Each range is represented by its normalized median value.

The Fourier coefficients of the boundary pixels of the segmented calcifications are used to define one of the boundary descriptors of the feature set. Fourier Descriptors can give a complete and flexible description of an object's shape with the additional advantage that they can be translation, rotation, and scale invariant. The measure FF is implemented, based on Normalized Fourier Descriptors (NFDs). Assuming that a segmented calcification has an N-pixel boundary, FF is defined as shown in FIG. 4. The NFD(n) is defined as shown in FIG. 5, where the S(n) is defined in FIG. 6, which are complex coefficients computed by a Fast Fourier Transform (FFT), with s(k)=x(k)+jy(k) being a complex number describing the coordinate pair of each boundary pixel.

The value of FF ranges from 0 to 1 and, generally, it is smaller for complex or rough shapes and larger for smooth shapes. Furthermore, this measure is insensitive to position, size, orientation, and starting point of the contour.

Another useful and practical set of shape descriptors is based on the theory of moments. Three descriptors are implemented that are based on low-order and central moments: (a) The moment-based measure M. Specifically, if the coordinates of the N pixels of a segmented calcification contour are described by an ordered set (x(i), y(i)), i=1,2, . . . ,N, the Euclidean distances z(i) of the vectors connecting the centroid of the segmented object and the ordered set of contour pixels form a one-dimensional representation of the contour. The $p^{th}$ moment can then be defined as shown in FIG. 7. And the $p^{th}$ central moment as shown in FIG. 8.

A set of shape factors has been developed, based on four low-order moments from the above ($m_1$, $\mu_2$, $\mu_3$, and $\mu_4$) avoiding higher order moments due to their increased sensitivity to noise. In this application, the measure M is used, defined as shown in FIG. 9. And the eccentricity $\epsilon$ is a second descriptor using low order moments and is defined in FIG. 10. In this case, for an image f(x,y), the moment of order p+q is defined in FIG. 11. The third descriptor is spread S and was based on the central moments of the boundary pixels. Spread was defined in FIG. 12, where $\mu_{pq}$ is shown in FIG. 13.

All these three measures range from 0 to 1. The factor M represents the roughness of a contour and increases as the irregularity of a shape increases. This descriptor is used to obtain information about shape roughness and to distinguish between various shape categories. Eccentricity E measures the degree to which an object's mass is concentrated along a particular axis; it is zero for a circular object and one for a linear object. The spread S measures how unevenly an object's mass is distributed about its centroid. It also takes values from 0 to 1; it is zero for circular objects and large for linear and nonuniform objects.

Figure 15A:
FIGS. 15a-c are representative detection/segmentation output of a cancer case with calcifications: (a) original ROI, (b) output of the wavelet filter, and (c) segmentation output.
Figure 15B:
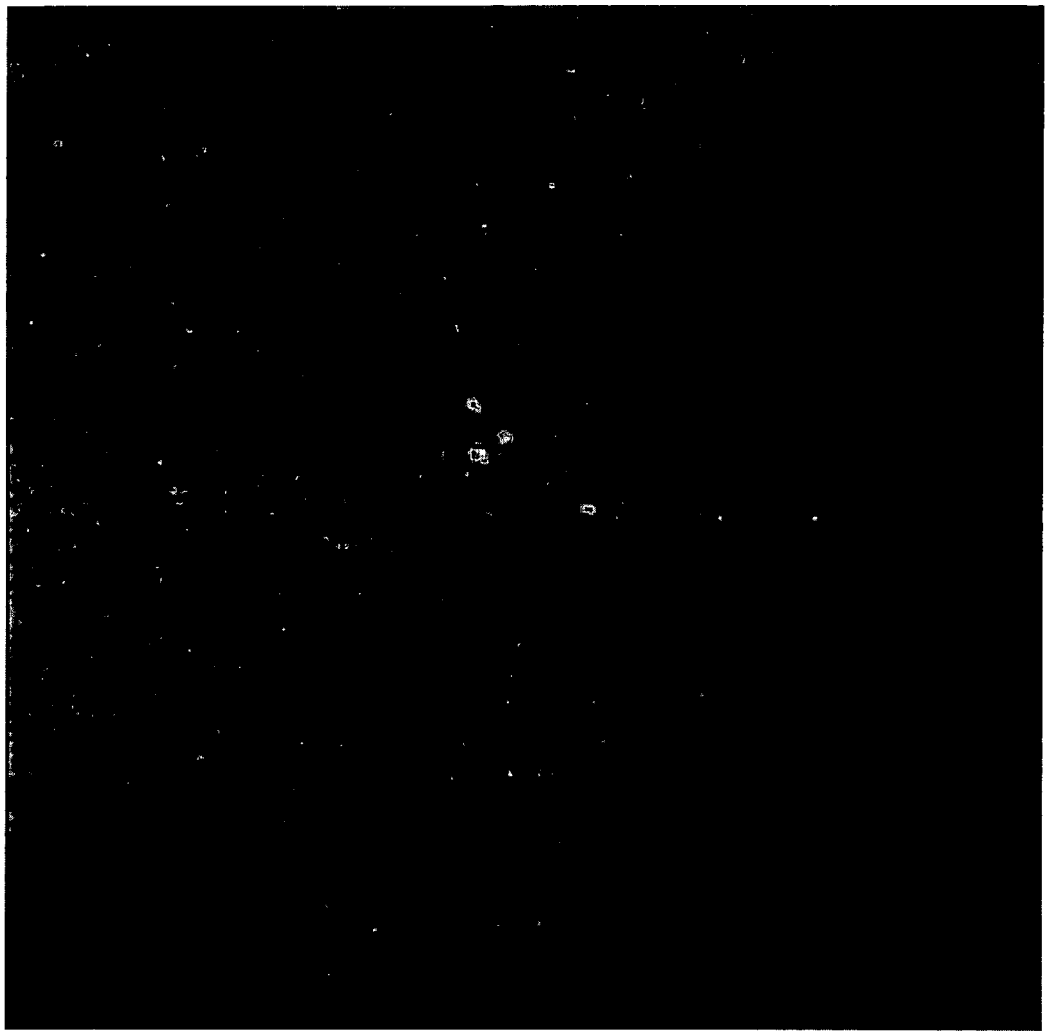
Figure 15C:
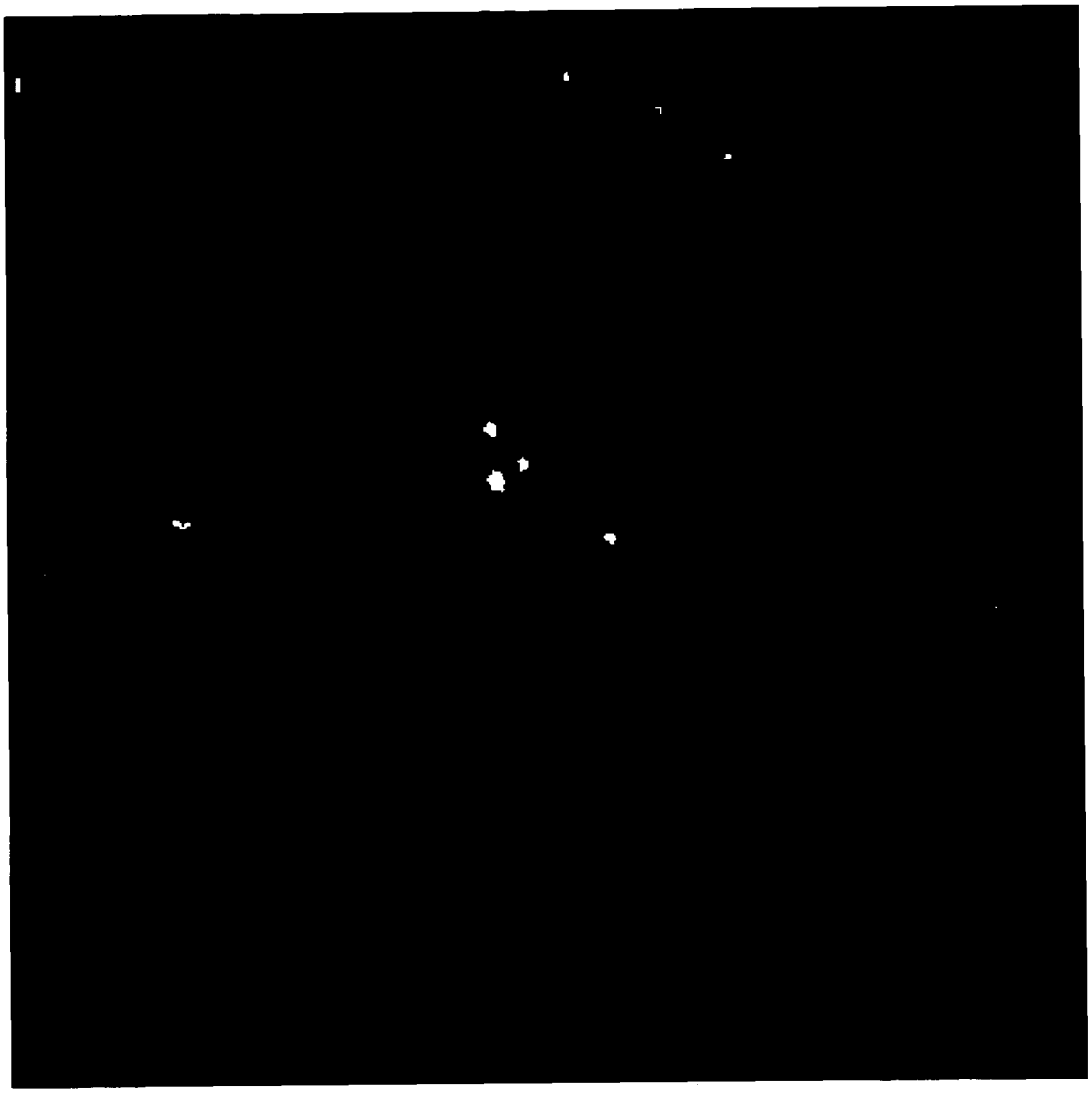

The potential of using the above measures as discriminants of benign from malignant clusters is investigated by using them as inputs to a classifier. Classification is done with a three-layer, feed-forward artificial neural network (ANN) consisting of an input layer, one hidden layer and an output layer. The NevProp1 backpropagation software is presently used. NevProp1 is the first version of a general backpropagation algorithm developed by Philip H. Goodman at the University of Nevada, Reno based on Quickprop 1.0 by Scott Fahlman. FIG. 15 shows a diagram of the network structure. The feature vector of the input layer consisted of 14 elements (features) and one bias, the means and standard deviations of the six shape features, the number of calcifications per cluster, and patient age. The hidden layer consists of 13 nodes and the output layer has one node yielding a total of 209 weights. For each cluster, the network was given the set of shape features at its input layer, merged these inputs internally using the hidden and output layers, and assigned a value in the range of 0 to 1 where 0 was the target output for the benign cases and 1 was the target output for the cancer cases.

The generalization error of the ANN classifier is estimated by the "leave-one-out" cross-validation method. With this technique, the network is trained on all but one of the cases in the set for a fixed number of iterations and then tested on the one excluded case. The excluded case is then replaced, the network weights are reinitialized, and the training is repeated by excluding a different case until every case had been excluded once. For N cases, each exclusion of one case results in N−1 training cases, 1 testing case and a unique set of network weights. As the process is repeated over all N, there were N(N−1) training outputs and N testing outputs from which the training and testing mean square error (MSE) is respectively determined. C and IDL programming languages are used for the implementation of the software and the analysis of the data on Sun Ultrasparc workstations.

The network structure implemented in this work would normally require a minimum of 2090 samples (10 times the number of weights), if standard split-sample training were used. However, the use of the leave-one-out cross validation resampling technique permits the use of a smaller set for training and testing and does not require an entirely separate set of data for confirmation of the training results.

For the database, a set of 100 mammograms with equal number of biopsy-proven benign and cancer cases associated with microcalcification clusters (50 each) are used to test the above hypotheses of the CADiagnosis methodology; an effort is made to include at least two of the various cluster types. All mammograms are selected from the patient files of the H. Lee Moffitt Cancer Center & Research Institute at the University of South Florida. Original mammograms are acquired on two different systems, both accredited by ACR and having similar performances. A DuPont Microvision film combined with a Kodak Min-R (one-sided) screen is used for all mammograms. Films are digitized with a DBA (DBA Inc., Melbourne, Fla.) ImagClear R3000 CCD-based film digitizer with a pixel size of 30 µm, a pixel depth of 16 bits, and a non-linear response to optical density. Full images are resized to 60 µm by mathematical interpolation keeping the pixel depth the same. Part of this dataset (86 cases; 44 cancer and 42 benign) is digitized again with a Kodak LS85 laser-based film digitizer at a pixel size of 60 µm, a pixel depth of 12 bits, and a linear response to optical density. This subset is used to evaluate the impact of different dynamic resolution characteristics on classification performance. For this application, 512×512 pixel ROIs are processed. ROIs are selected from the full 601m images to contain the calcification cluster of interest.

Figure 16:
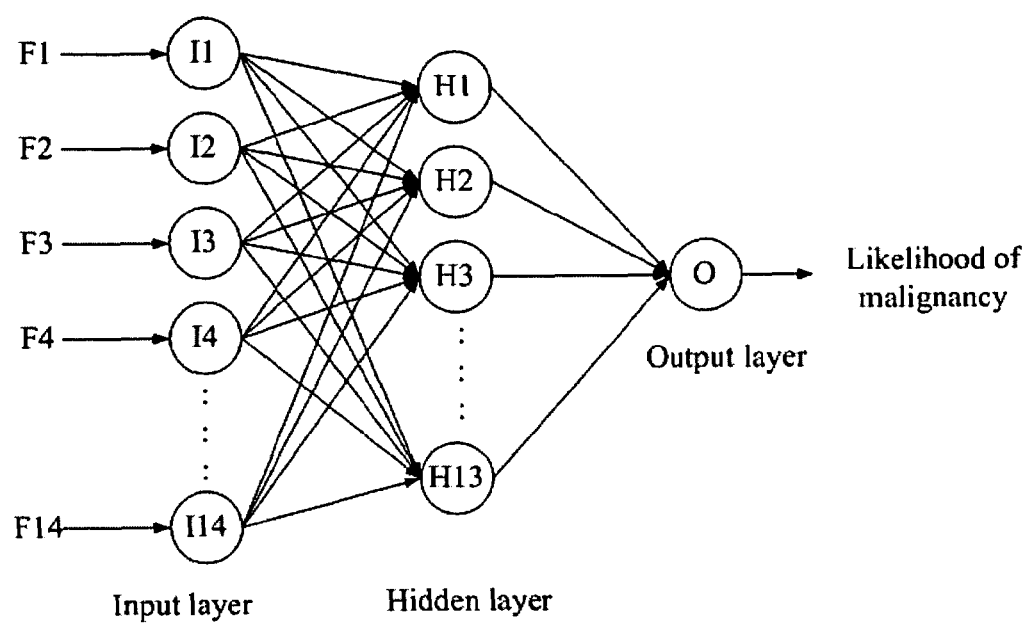
FIG. 16 is a diagram of the NevProp1 network used for cluster classification. This is a standard 3-layer, feedforward, backpropagation neural network where F1-F14 are the input features, I1-I14 are the Input Units, H1-H13 are the Hidden Units, and O is the Output Layer.
Figure 17:
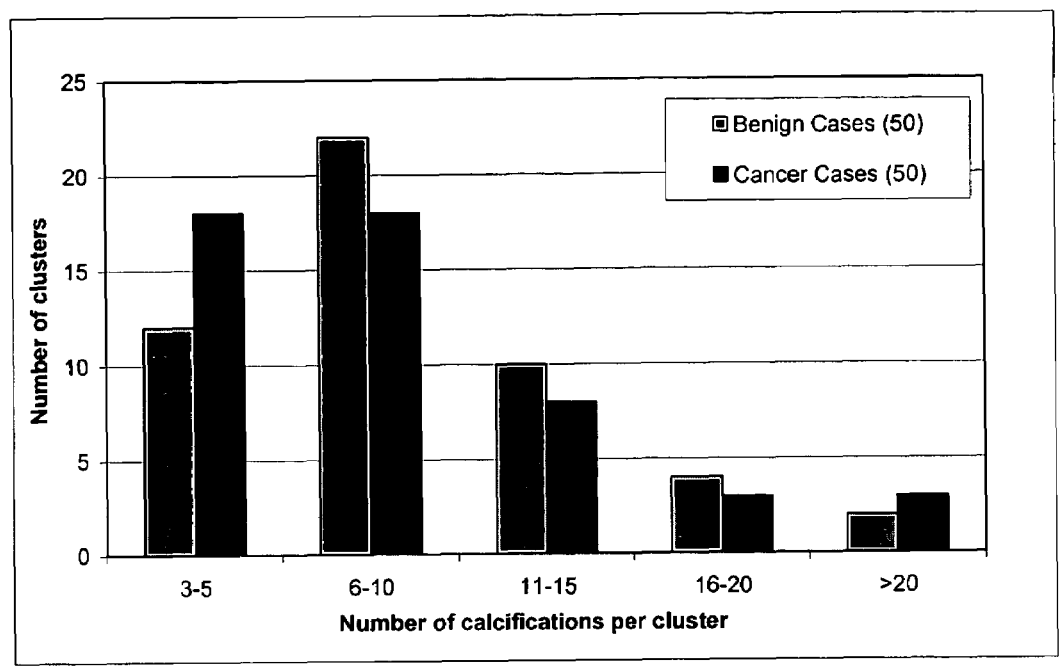
FIG. 17 is a histogram of the size of the calcification clusters used in this study for the training and testing of the CADiagnosis algorithm.

FIGS. 16 and 17 present histograms of the size and contrast of the 100 tested calcification clusters respectively. Size was defined as a range of the number of calcifications distinguishable on the image. Calcification contrast was defined as the difference in image intensity between a single calcification and its immediate background divided by the background intensity. Cluster contrast was defined as the average of three contrast values estimated from the three most prominent calcifications in the cluster. These histograms offer a measure of the database contents and the subtlety of the tested calcifications. Although subtlety may not be considered a major issue in a pure classification task, our methodology includes an automated detection/segmentation step prior to classification that had to be challenged in order to better understand the clinical impact on the final outcome. The histograms in FIGS. 16 and 17 show that our set consisted of relatively small clusters of low contrast, a feature that usually challenges the detection and segmentation processes and may be used to indicate the relative difficulty of the dataset.

A second set of 96 ROIs with calcifications (50 cancer and 46 benign cases) is collected from cases acquired at the Uniformed Services University of the Health Sciences (Bethesda, Md.). These mammograms are recorded on Kodak. Min-R film/screen combination and digitized with a Kodak LS85 digitizer to 60 µm or 80 µm and 12 bits per pixel for small and large films respectively. The set is used to evaluate the effect of different images sources on classification performance.

The optimum parameters of the neural network are first determined including number of iterations (epochs), feature selection, and feature ranking. The Root Mean Square (RMS) error is used as a criterion to stop the NevProp's training. The RMS error is a measure of how close each pattern's predicted value is to its true outcome and its minimization determined the training set weights that "best" generalize the network under various conditions.

Feature selection and ranking is done by first training the ANN using all features as input; the outcome of this first run was used as reference. Then, one feature is excluded from the set and the ANN was retrained with the remaining features only. The feature was replaced in the set and a new one was removed. This process is repeated until all features were excluded once. A computer ROC curve is generated after each run with the true positive (TP) and FP fractions estimated at different thresholds. ANN performance was measured by the corresponding $A_Z$ index, i.e., the area under the ROC curve. The hypothesis is that the more important a feature was, the larger decrease it would cause to the $A_Z$ index from the reference value ($A_{Z0}$) when removed from the set.

The segmentation stage of the algorithm is evaluated by estimating the number of TP and FP clusters of calcifications at the detection/segmentation output. Electronic truth files generated by an expert mammographer are used for comparison. These truth files contained an outline of the cluster area as well as outlines of the major calcifications in the cluster. A segmented group of calcifications is considered as TP when it contained at least 3 segmented true calcifications. An FP cluster was one that consisted of at least 3 segmented objects outside the area of the true cluster within a distance of $\leq 1$ cm from each other.

Figure 18:
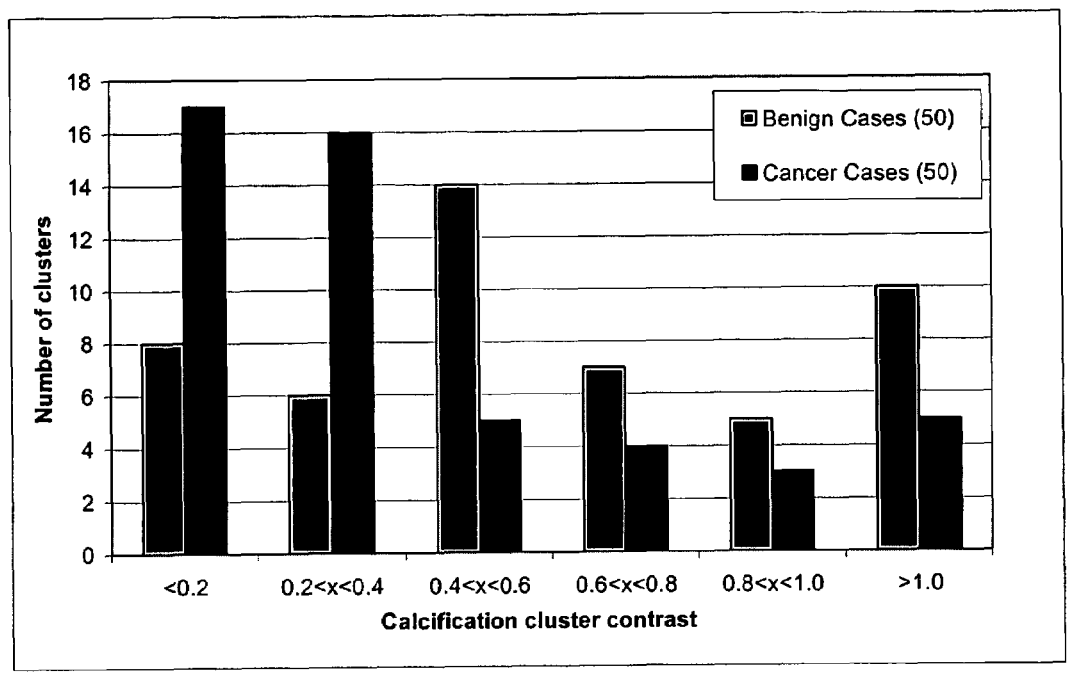
FIG. 18 is a histogram of the average contrast of the calcification clusters used in this study for training and testing of the CADiagnosis algorithm.

FIG. 18 shows how the estimation of TP and FP clusters is done for the case presented in FIG. 14. Two clusters are identified in this case: a TP one that includes at least 3 true calcifications and some false signals within the boundaries of the true cluster as determined in the truth file (solid contour) and a FP cluster that contains only false signals with inner distances of $\leq 1$ cm and all outside the boundaries of the true cluster. There are two important points to make for the segmentation output: (a) TP clusters may or may not contain false signals. (b) The entire segmentation output is given as input to the shape analysis stage of our algorithm independent of the number of FP signals.

The impact of FP signals in the segmentation output on the network's performance is investigated by running the network on segmentation data where false signals are manually removed and comparing its performance to the performance from the original "unfiltered" segmentation outputs.

The impact of image source and digitization conditions on the algorithm's performance is evaluated by processing image datasets from different Institutions and mammography systems, and different film digitizers.

In the performance evaluation experiments, the classification error rate of the algorithm is determined by estimating the fraction of the incorrectly classified benign and cancer cases at various thresholds on the network's output value. A threshold on the output may be considered as a binary operating condition that leads to the separation of cases in benign and cancer groups. Benign cases that are assigned a value above the threshold value were considered as incorrectly classified. Similarly, malignant clusters assigned a value below the selected threshold are considered as incorrectly classified. The fraction of the benign or cancer cases incorrectly classified at the different thresholds yields respective error rates that are used to evaluate the algorithm's performance and determine an optimum operating point for the clinical implementation of the methodology.

Nine threshold output values or operating points are evaluated between 0 and 1 at 0.1 increments. The classification error rates obtained from the analysis of the benign and malignant calcification clusters are plotted separately. An error rate for the entire dataset is also calculated and plotted for reference purposes as the average value.

In addition to the classification error plots that provide an easy and convenient tool in the evaluation of the various strategies followed in the work, the more familiar and standard approach of generating computer ROC plots is also followed. The area under these curves ($A_z$) provide an additional criterion of algorithm performance.

The minimum number of iterations required to minimize RMS is 200 based on the classification error rates.

Figure 19:
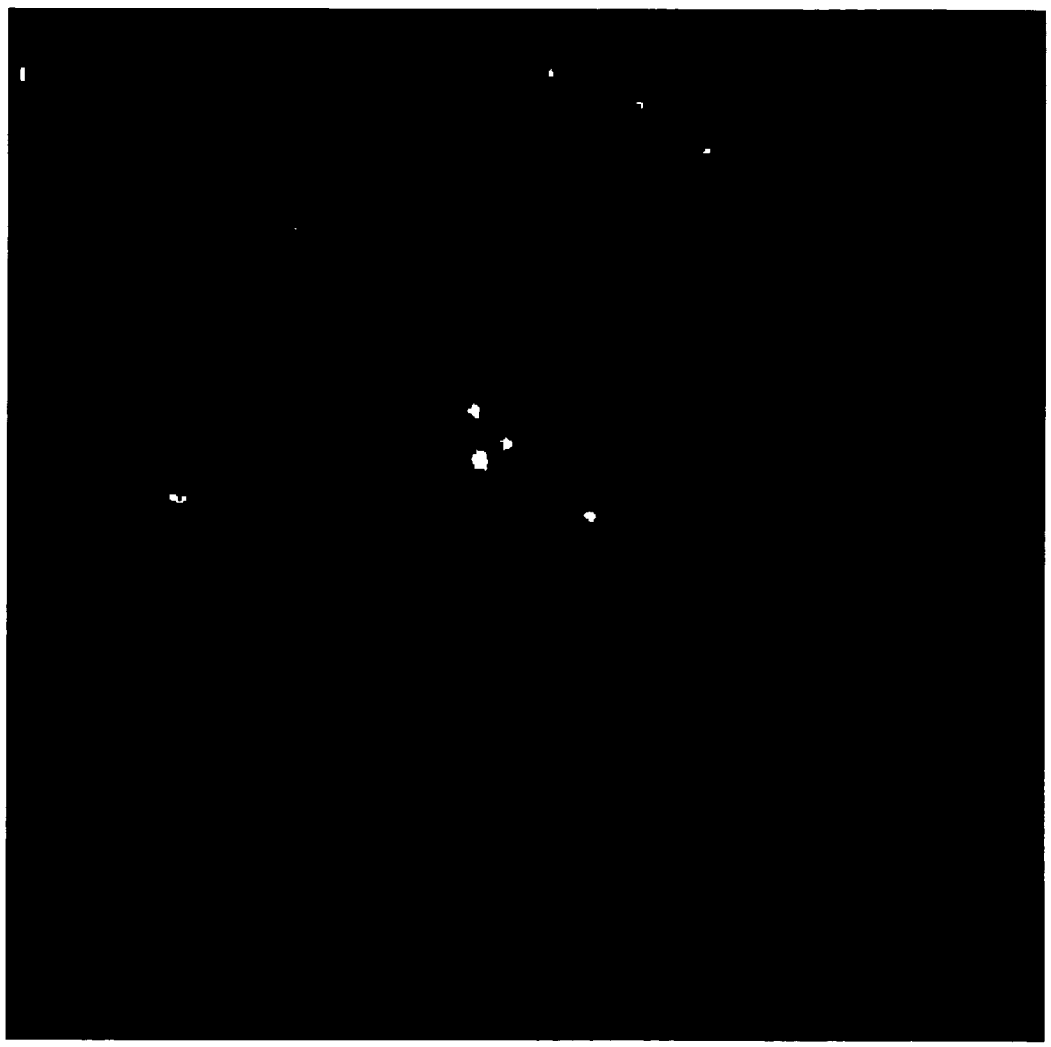
FIG. 19 is an example of the TP and FP estimation process followed for the evaluation of algorithm performance at the segmentation output. One TP cluster is identified in this case within the boundaries identified in the truth file (solid contour). One FP cluster is also identified within 1 cm² area (dashed box). Two single, isolated objects are also segmented that correspond to false signals but are not included in the estimation of TP and FP rates. This entire output is used as input to the shape analysis stage of our algorithm.

FIG. 19 shows the classification error rate plots as a function of threshold at the classifier's output for the 100 benign and cancer cases, 200 epochs, and all 14 features. Threshold values in the range of 0.4 to 0.5 yield the best performance (smallest error rate) for all cases and this range was used for relative comparisons and for selecting a clinical operating point.

Table 4 lists the error rates at thresholds 0.4 and 0.5 for four different iteration numbers and three different feature sets.

TABLE 4

Classification Error Rates as a Function of Number of Iterations (Epochs) of the Classifier at Two Thresholds of Interest

| Classifier Threshold | Iterations | Error Rate Malignant | Error Rate Benign | Error Rate Average |
|---|---|---|---|---|
| 0.4 | 100 | 0.02 | 0.45 | 0.24 |
| 0.4 | 200 | 0.00 | 0.40 | 0.20 |
| 0.4 | 400 | 0.00 | 0.40 | 0.20 |
| 0.4 | 800 | 0.00 | 0.41 | 0.21 |
| 0.5 | 100 | 0.05 | 0.24 | 0.15 |
| 0.5 | 200 | 0.02 | 0.20 | 0.11 |
| 0.5 | 400 | 0.02 | 0.21 | 0.12 |
| 0.5 | 800 | 0.02 | 0.20 | 0.11 |

The error rate remains relatively constant after 200 iterations for any parameter combination unless the number of cases was decreased. Out tests showed that if fewer than 100 cases were used, a larger number of epochs was required to minimize RMS. If more than 100 cases were used, 200 iterations seemed to still be adequate for the training.

Twelve(12) of the features used in this study are initially identified and ranked on simulated calcification clusters. For comparison, the same 12 features were ordered again by importance for the real calcification cases. The ranking of the 12 features for the real data is listed in Table 5. The results from the simulated calcification cases are included for comparison.

TABLE 5

Feature rank order by importance using the area under the ROC curve as criterion of the network's performance when specific feature excluded from input set

| Feature Rank | Simulated Clusters Feature | Az | Real Calcification Cases Feature | Az |
|---|---|---|---|---|
| 1 | Compactness | 0.904 | Compactness | 0.822 |
| 2 | Fourier Descriptors | 0.905 | Eccentricity | 0.825 |
| 3 | Spread | 0.906 | SD of Fourier Descriptors | 0.830 |
| 4 | SD of Area | 0.908 | SD of Eccentricity | 0.832 |
| 5 | SD of Moments | 0.912 | SD of Spread | 0.835 |
| 6 | SD of Compactness | 0.922 | Area | 0.839 |
| 7 | SD of Eccentricity | 0.927 | Spread | 0.840 |
| 8 | SD of Spread | 0.928 | SD of Area | 0.843 |
| 9 | Area | 0.932 | SD of Moments | 0.847 |
| 10 | Eccentricity | 0.933 | Moments | 0.848 |
| 11 | Moment | 0.935 | Fourier Descriptors | 0.849 |
| 12 | SD of Fourier Descriptors | 0.936 | SD of Compactness | 0.851 |

Changes in the ranking order of the features are probably due to differences in the cluster types represented in the two datasets and particularly in the morphological characteristics of the two sets. Despite these differences, however, there were no major failures in feature selection and the results supported our initial assumption that a simulation study could provide a good guiding tool in the development of a CADiagnosis methodology for mammographic calcifications.

Once the shape features are tested and ranked for the real cases, the focus is in the selection of additional features that would increase classification performance up or above the results reported from the visual analysis system. The two features that are added to the original set are the number of calcifications in the cluster as determined at the detection/segmentation output and the patient's age. These features prove to be very powerful discriminants of benign from malignant calcifications. In a preliminary ranking experiment, patient age is ranked at the top of the list of all features followed by the number of calcifications and the 12 shape features in the order listed in Table 5 for the real calcification cases. This set of 14 features is used in all experiments reported here.

Based on the prediction value given by the network for each calcification case, an ROC curve is generated, of the algorithm's performance by varying the threshold value. The proposed CADiagnosis methodology has the potential to achieve 100% sensitivity (correct identification of cancers) and 80% specificity (correct identification of benign cases) in the classification of clusters of calcifications. Such laboratory performance holds great promise for the clinical application and evaluation of this methodology that is the next step in this development. The operating point for the clinical study will be set at a threshold of 0.5.

Figure 20:
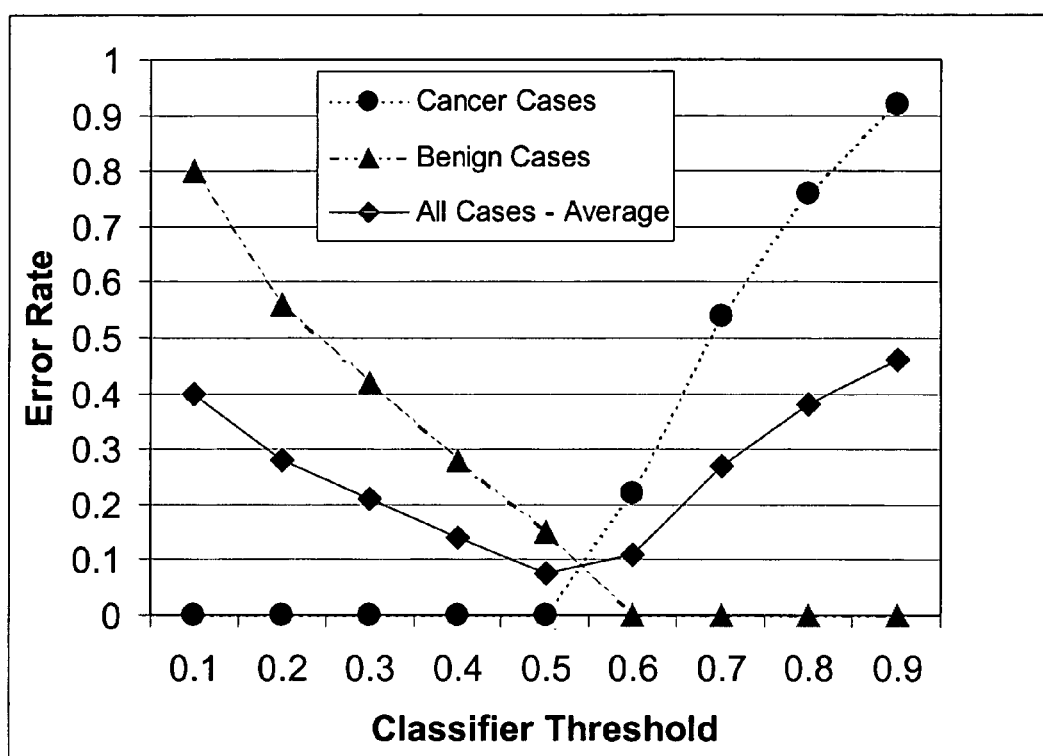
FIG. 20 is a plot of the classification error rate vs. the threshold at the classifier's output for all 100 cases (50 cancer and 50 benign).

Based on the prediction value given by the network for each calcification case, an ROC curve was generated of the algorithm's performance by varying the threshold value as in FIG. 19. This curve is shown in FIG. 20. Based on FIGS. 19 and 20, we observe that the proposed CADiagnosis methodology has the potential to achieve 100% sensitivity (correct identification of cancers) and 80% specificity (correct identification of benign cases) in the classification of clusters of calcifications. The operating point for the clinical study will be set at a threshold of 0.5 based on the results of FIGS. 19 and 20.

Due to the attained performance levels, the CADiagnosis system is comparable, if not better, than the visual system of differential diagnosis. The latter is also based also on morphological properties of single and grouped calcifications and has been shown to yield 97.6% sensitivity (correct identification of cancers) and 73.3% specificity. Although a direct comparison between the CADiagnosis and the visual system is not possible due to database and image quality differences, the clinical practice can be adequately and successfully represented by a seamless automated approach.

Following the above guidelines for all 100 ROIs in the present set, it is determined that for a 100% TP rate, an average of 2.8 FP clusters are segmented per image. Reducing the FP rate to less than 2 FP clusters per image yield a TP rate of 95%. Since the loss of TP signals is not desirable, a performance at 100% sensitivity is selected at the expense of a relatively large number of FP signals.

Figure 21:
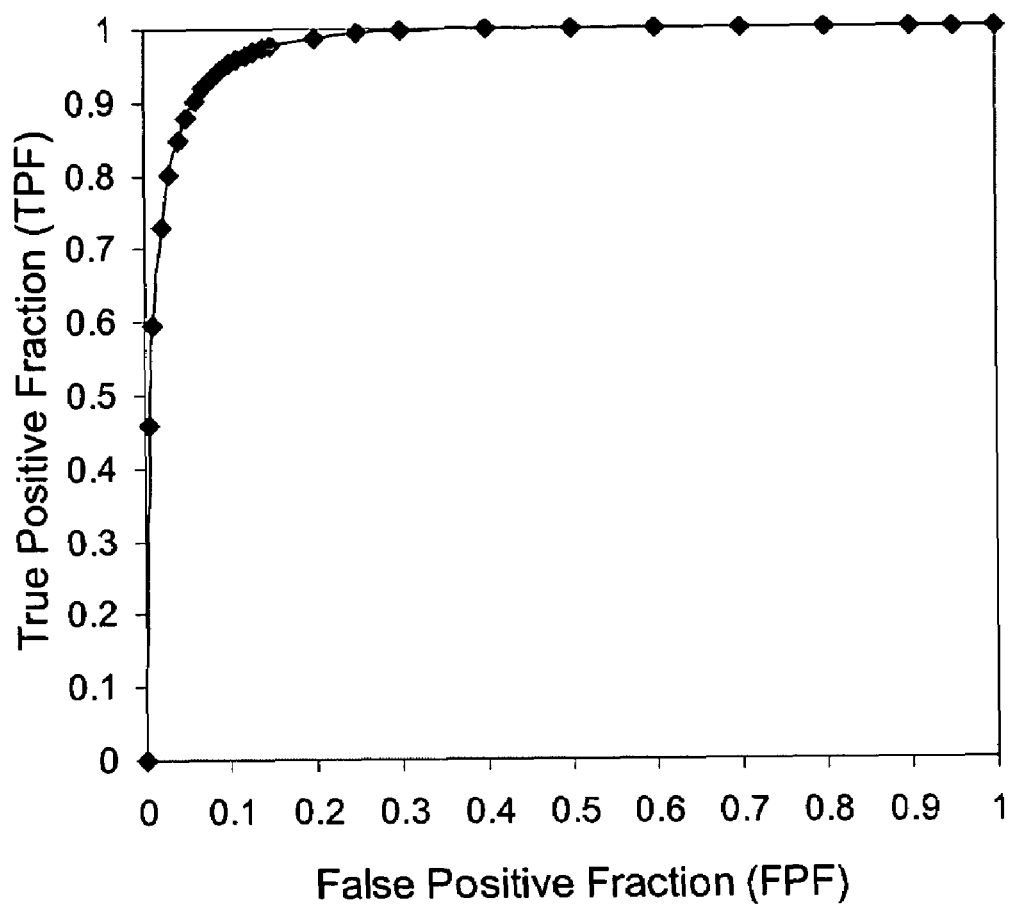
FIG. 21 is a ROC curve of the CADiagnosis algorithm's performance on the 100 (50 cancer and 50 benign) calcification cases.
Figure 22:
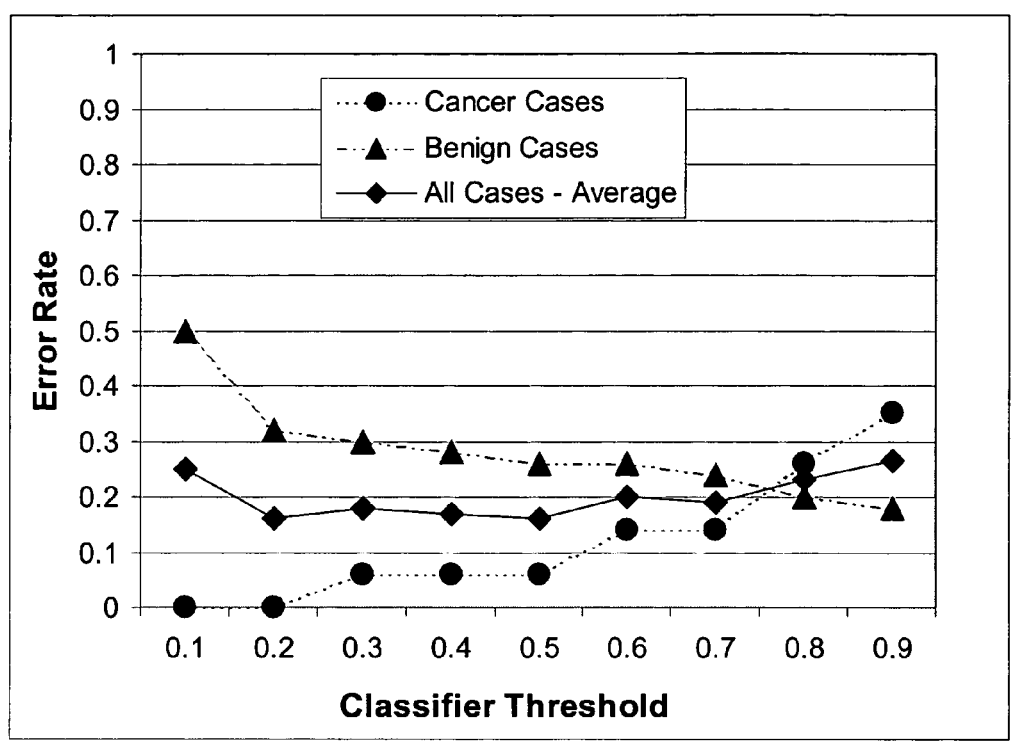
FIG. 22 is a classification error rates vs. classifier threshold for 30 cases with the smallest clusters (3-10 calcifications per cluster). The original ROIs and all 14 features were used in this process.

To estimate the impact of FP signals on the classification performance, all FP clusters and all single are manually eliminated, false signals that are outside the boundaries of the true cluster from a subset of 30 cases that contain small calcification clusters (3-10 calcifications per cluster) are isolated. The original and FP-free ROIs are processed by the shape analysis and classification stages of our algorithm yielding the classification error rate plots shown in FIGS. 21 and 22. The elimination of the FP signals can lead to uniformly lower error rates at all thresholds for the benign cases but has a mixed, although still beneficial, effect on the cancer cases. About a 30% reduction in error rate is observed for the benign calcification clusters at all classification threshold levels. A reduction of up to 50% is observed for the malignant clusters at classifier threshold levels from 0.3 to 0.7. Desirable operating points, i.e., thresholds that yield a high sensitivity, specificity, and positive predictive value, also shift to higher values for both benign and cancer cases. The presence of very small false objects in the segmentation output degrade classification performance more than large false objects; this probably explains why the impact is greater for the benign than the cancer cases. A minimum size criterion is established as described earlier where all segmented objects of 4 pixels or less are automatically eliminated from the segmentation output.

Figure 23:
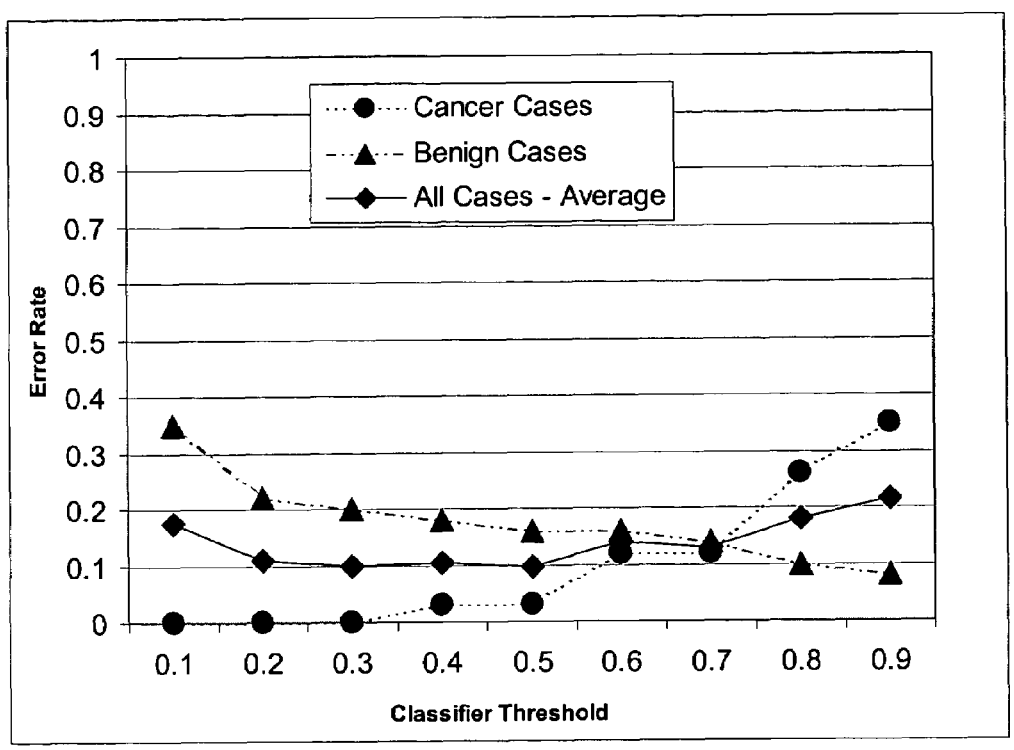
FIG. 23 is classification error rates vs. classifier threshold for 30 cases with the smallest clusters (3-10 calcifications per cluster) after manual removal of all FP signals (FP-free ROs).
Figure 24:
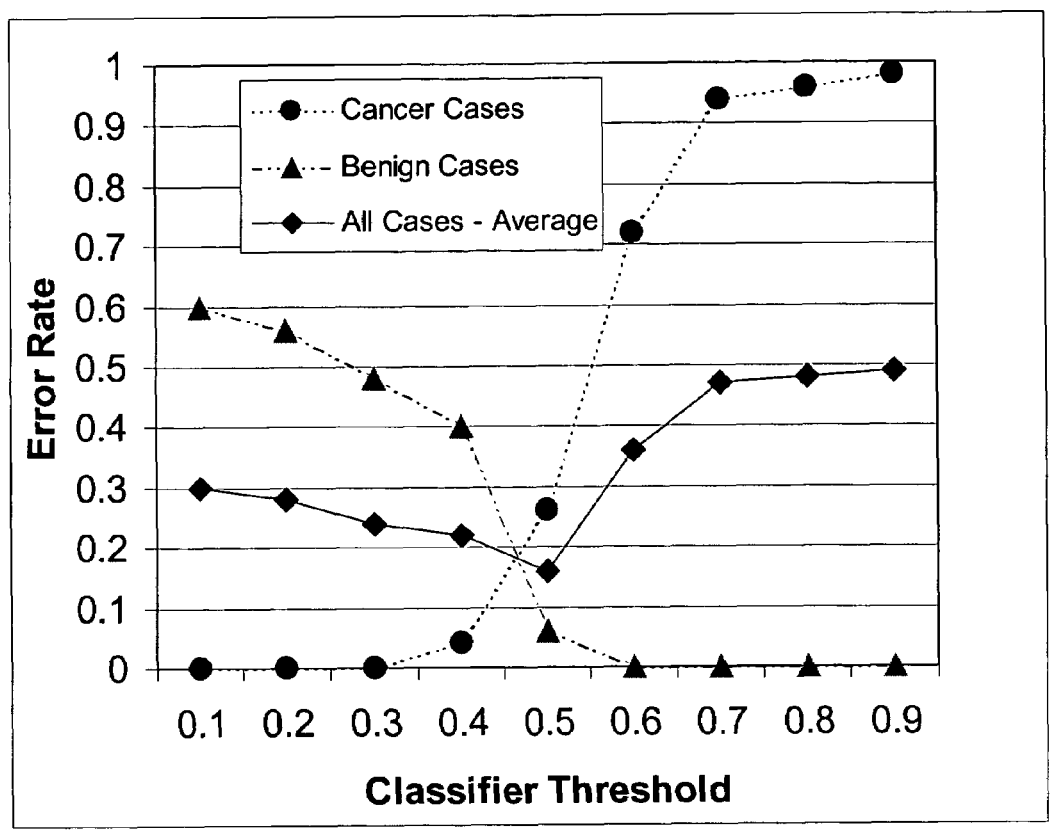
FIG. 24 are classification error rates for the subset of 86 cases (44 cancer and 42 benign) that were digitized with a Kodak LS85 scanner at a resolution of 60 µm and 12 bits per pixel. The standardization step was not included in this run.

The effect of the differences in the digitizers' dynamic range and response functions on the CADiagnosis algorithm while keeping pixel size constant is evaluated. The pixel size is the same for both datasets but pixel depth and response functions are different. FIG. 23 shows the error rates vs. threshold values obtained from this experiment. Comparing the results in FIGS. 19 and 23, a decrease in performance is observed (higher error rates) for the classification of the Kodak-digitized cases relative to the DBA-digitized cases particularly for the benign cases. An in-house developed image standardization step that converts Kodak-digitized images to DBA-digitized images by matching the histogram and spatial resolution of the former to the latter is implemented. The standardization process yields similar "best" performances from the two datasets although at slightly different thresholds for the DBA and standardized Kodak data as seen in FIGS. 19 and 24. Other differences may be attributed to the standardization process but mostly to the different number of cases used for the two tests.

Figure 25:
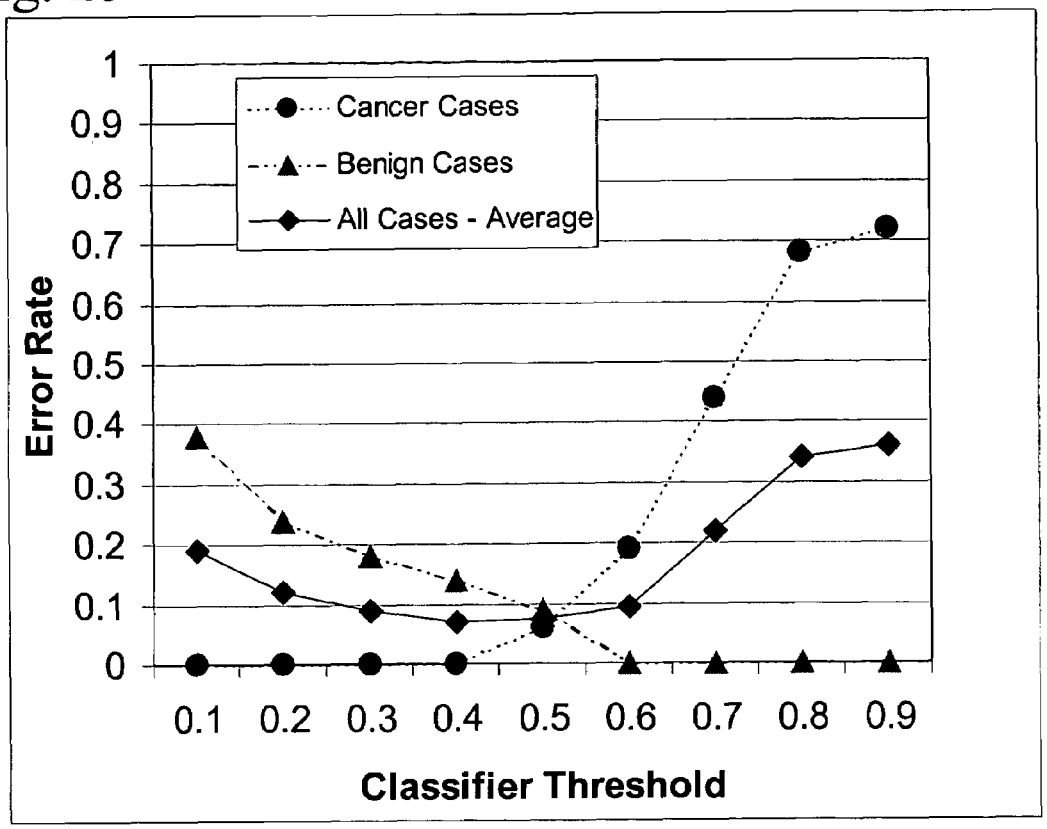
FIG. 25 are classification error rates for the subset of the 86 cases of FIG. 23 following the standardization of the images to resemble DBA digitized films.
Figure 26:
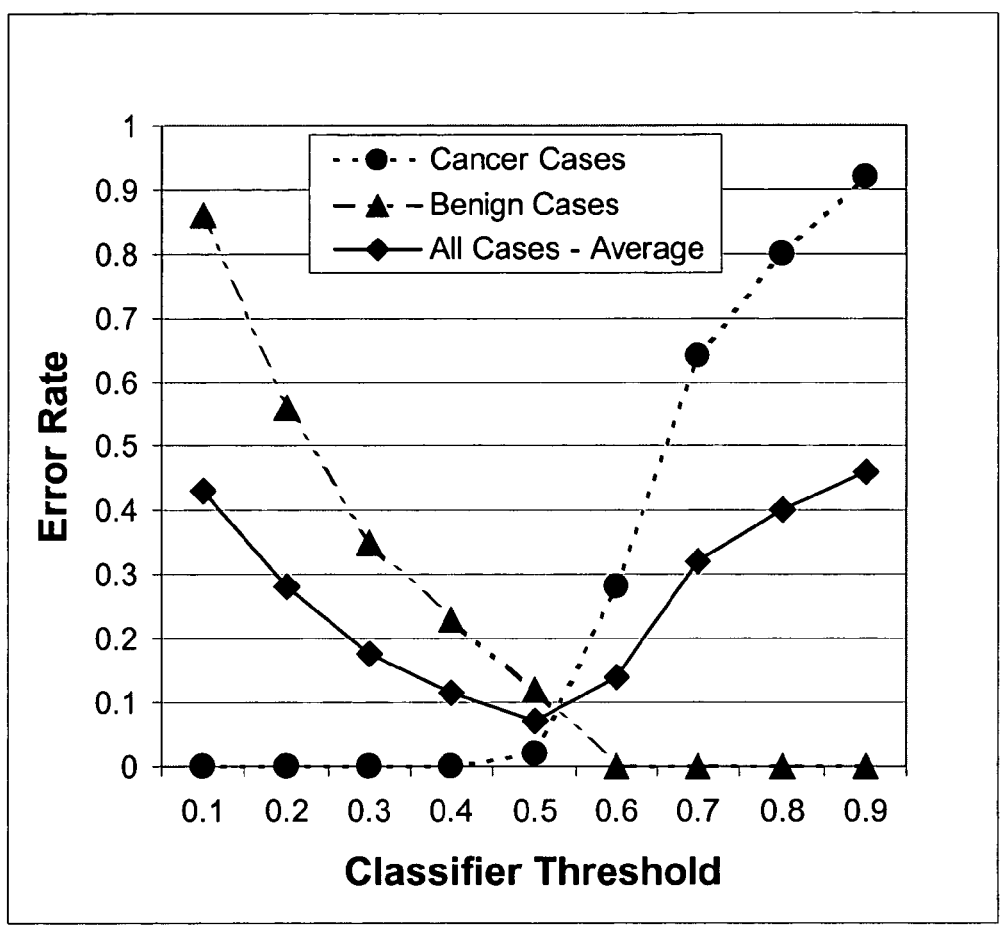
FIG. 26 are classification error rates for the set of 96 cases of calcifications acquired at USUHS. This set had a different screen/film combination and was digitized with a Kodak LS85 scanner at a resolution of 60 or 80 µm and 12 bits per pixel depending on the film size. These results included standardization of the images to the properties of our primary set.

In addition to the study of the digitization effects, the set of 96 cases with calcifications from USUHS is also tested in order to evaluate the effect of different image source (different screen/film combinations as well as digitizers) on classification performance. Again, the CADiagnosis algorithm is applied without any modifications. The results of the run that included the standardization step are shown in FIG. 25 and are comparable to those obtained with the primary set of 100 cases shown in FIG. 19.

All algorithm's parameters are kept the same for the various evaluation experiments. It is possible that one could achieve high performance avoiding standardization by using a different set of features, number of iterations, stopping criterion, segmentation, or detection methodologies. However, the goal of these evaluation tests is to determine whether and how it would be possible to apply the proposed methodology as is to different datasets without internal readjustment to match the various imaging parameters.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of differentiating benign from malignant calcifications comprising the steps of:
   detecting and segmenting breast calcifications from mammographic images of a patient;
   analyzing the shape and distribution of the calcifications and estimation of preselected parameters using image and non-image data from the patient's file and demography; and
   differentiating between benign and malignant calcification clusters and assignment of likelihood of malignancy using a predefined classifier.

2. The method of claim 1, wherein the predefined classifier is generated from a population of known benign and malignant calcification clusters from image and non-image data.

3. The method of claim 1, wherein the classifier utilizes shape descriptors comprising regional descriptors and boundary descriptors of an object.

4. The method of claim 3, wherein the regional descriptors comprise area and compactness of the object.

5. The method of claim 3, wherein the boundary descriptors comprise the shape of the object.

6. The method of claim 1, further comprising the step of inputting the patient's non-image data as a demographic feature that links images to patients, wherein the data is selected from the group consisting of the patient's age, the patient's physical data, the patient's family history, the patient's history, the patient's race, the patient's weight, the patient's gender, and the patient's lab test results.

7. A method of differentiating benign from malignant calcifications comprising the steps of:
   implementing an automatic detection and segmentation system with a pattern recognition process of breast calcifications from mammographic images of a patient;
   analyzing the shape and distribution of the calcifications and estimation of preselected parameters using image and non-image data from the patient's file;
   inputting the patient's age as a demographic feature that links images to patients; and
   differentiating between benign and malignant calcification clusters and assignment of likelihood of malignancy using a classifier, wherein the automated method yields an detection and likelihood of malignancy.

8. The method of claim 7, wherein the automatic system is computer aided diagnosis of medical imaging.

* * * * *